Figure 1:
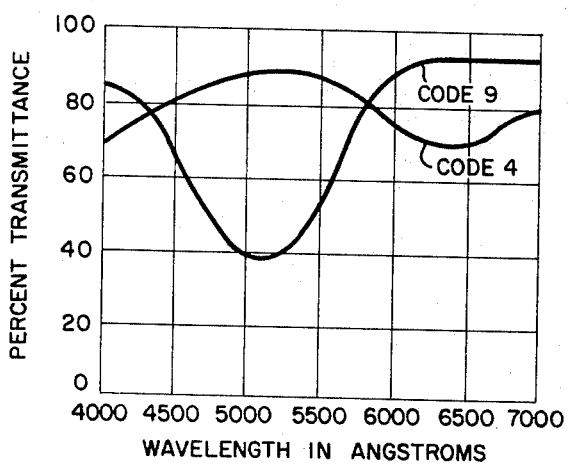

Aug. 6, 1968  J. A. LONG ET AL  3,395,487
METHOD OF GROWING GRASSES UNDER MODIFIED LIGHT
Filed March 24, 1966  2 Sheets-Sheet 1

INVENTORS
JOHN A. LONG
EUGENE W. MAYER
BY GEORGE R. MC VEY
Strauch, Nolan, Neale,
Nies & Bronaugh
ATTORNEYS

INVENTORS
JOHN A. LONG
EUGENE W. MAYER
BY  GEORGE R. MC VEY

ATTORNEYS 3,395,487
METHOD OF GROWING GRASSES UNDER
MODIFIED LIGHT
John A. Long, Eugene W. Mayer, and George R. McVey, Marysville, Ohio, assignors to The O. M. Scott & Sons Company, Marysville, Ohio, a corporation of Ohio
Filed Mar. 24, 1966, Ser. No. 537,137
6 Claims. (Cl. 47—58)

This invention relates to the growing of turf and, more specifically, to novel, improved methods of growing turfs in controlled environments.[1]

One problem for which there has heretofore been no satisfactory solution is that of growing turfs in enclosed structures which are intended for human occupancy such as stadiums, greenhouses, indoor swimming pools, patios, botanical gardens, etc. The problem is particularly acute in the case of those structures in which temperature, humidity, and other environmental factors must be selected for the comfort of the occupants rather than to provide an optimum environment for the turf.[2] And, in structures such as athletic stadiums, the problem is compounded by the necessity of eliminating glare, which has heretofore been accomplished only at the expense of killing the turf within the structure.

It has now surprisingly been found that turf equal or superior in quality to that grown in full sunlight may be produced in enclosures such as those listed above by limiting the wave lengths of the light reaching the turf to a relatively narrow band or spectral range. Unexpectedly, it has also been found that the intensity of such light needed to produce high quality turfs is substantially less than the full intensity sunlight heretofore thought necessary for producing such turfs.

Preferably, the light reaching the turf will have wave lengths primarily in the upper or shorter wave length part of the spectrum. Specifically, light having wave lengths in the range of approximately 4000–6000 angstroms has been found to give good results although light having wavelengths ranging from about 4375–5100 angstroms has been found to be markedly superior to that of other wavelengths for many common grasses. In all cases the elimination of light in this wavelength range from the light reaching the turf resulted in a turf of inferior quality.

The intensity of the controlled wavelength light necessary to produce high quality turfs may range down to about 23% of the intensity of full sunlight although a minimum intensity of approximately 55% is preferred for bluegrasses. Preferably, the intensity of the light reaching the turf will not exceed about 80% of the intensity of full sunlight; and it appears that nothing is gained by increasing the intensity above about 77% of the intensity of full sunlight.

Light with the proper characteristics may conveniently be supplied to the turf by employing the sun as a light source and by interposing between it and the turf a barrier which will transmit primarily only light in the preferred portion of the spectrum. Preferred barrier materials are pigmented and tinted plastics. Proper selection of the barrier material and characteristics such as thickness, etc. will also result in light of the desired intensity reaching the turf.

As suggested above, one of the important advantages of this method of growing turf is that high quality turfs can be grown in controlled environments such as are present in enclosed structures. In comparison to turfs grown in full sunlight those grown in accord with the principles of this invention typically exhibit improved color, better density, and reduced seedhead development. These characteristics are often associated with excellent height growth response and clippings removal comparable or better than those of turfs grown in full sunlight.

Another important advantage of this method is that the preferred barriers employed to control light transmittance to the turf produce much less glare than would a transparent barrier, for example and have a materially lower reflectance than the latter. This advantage is particularly important in the case of athletic stadiums, as mentioned above.

A further important advantage of the method disclosed herein is that the preferred barrier materials substantially impede the flow of heat. The temperature under such a barrier will range at least several and as many as ten or more degrees below that beneath an otherwise comparable transparent barrier. This materially reduces the amount of refrigeration required to produce a comfortable or otherwise acceptable temperature in the enclosure, which is an important economic advantage.

In the case of Bermuda grass, the method disclosed herein has the further advantage that it materially retards spike development. This is entirely unexpected and of material importance as Bermuda turfs produced in accord with the present invention are of dramatically higher quality than those which develop in uncontrolled environments.

That light having particular wave lengths or a particular intensity will affect plant growth or development is not claimed to be in itself a novel concept. Such findings have been reported by Sylvia R. Frank in The Effectiveness of the Spectrum in Chlorophyll Formation, Jour. Gen. Physiol. 29:157–179, 1946; by W. H. Hoover in The Dependence of Carbon Dioxide Assimilation in a Higher Plant on the Wave Length of Radiation, Smithsonian Misc. Coll. 95: No. 21, 1937; by H. A. Borthwick et al. in Wave Length Dependence and the Nature of Photoperiodism, Lotsya 1:71–78, 1948b; by H. Sierp in Undersuchungen uber die Offnungskewegungen der Stomata in Verschiedenen Spekiralbezirken, Flora 128:269–285, 1933; by B. S. Meyer et al. in Plant Physiology, D. Van Nostrand Co. Inc., New York, N.Y., p. 628, 1952; by F. W. Went in Effects of Light on Stem and Leaf Growth, Amer. Jour. Bot. 28:83–95, 1941; by J. Bensink in "Morphogenetic Effects of Light Intensity and Night Temperature on the Growth of Lettuce (*Lactuca sativa* L.) with Special Reference to the Process of Heading," Proc Koninkl Ned Akad Wetenschap C61:89–100, 1958, published in Photoperiodism, edited by R. B. Withrow, Pub. No. 55, AAAS, Washington, D.C., 1959, p. 122; by E. C. Wassink et al. in Dependence of Formation and Photoperiodic Reactions in *Brassica rapa* var. Cosmos and Lactuca on Wavelength and Time of Irradiation, Proc Koninkl Ned Akad Wetenschap 654: 421–32, 1951; by I. Horvath et al. in Effect of Light Intensity on the Metabolic Pathways in Photosynthesis, Nature No. 4996, 207, pp. 546–47, 1965; and by E. J. Kraus et al. in Vegetation and Reproduction with Special Reference to the Tomato, Oregon Agric. Expt. Sta. Bull. No. 149, 1918.

None of the literature, however, recognizes that beneficial results can be obtained by controlling both the wave length and intensity of light reaching growing plants or that proper selection of either of these factors is important in growing turfs in controlled environments. A fortiori, there is no suggestion in the literature of the par-

---

[1] By controlled environment is meant one in which environmental factors such as temperature, humidity, light quality and/or intensity, etc., and various combinations of (or all) environmental factors can be regulated. This contrasts with an uncontrolled environment in which environmental factors are dictated by nature.

[2] Turf has heretofore been grown under clear glass in greenhouses, cold frames, etc. For obvious reasons, however, this is not a practical solution to the problem of growing turfs in controlled environments in enclosed structures such as those intended to house athletic contests, etc. In fact, the fragility of glass of a practical thickness and the light and heat transmitting characteristics of clear glass makes glass comparatively unsuitable even for greenhouses and the like, it only having been used in the absence of a better material.

ticular wave lengths or intensities required for the production of high quality turfs.

Among the objects of the present invention are the provision of novel, improved methods of growing high quality turfs in controlled environments.

Another important object of the present invention is the provision of novel, improved methods of growing turfs in which the wave lengths and intensity of light reaching the turf is controlled and restricted.

Yet another important and related object of the present invention is the provision of novel, improved methods of growing turf in which the turf is isolated under a barrier capable of transmitting light primarily only in a narrow wave band and at an intensity substantially lower than the intensity of full sunlight.

A related and also important object of the present invention is the provision of novel, improved methods of growing turf in enclosed structures under light transmitting barriers having substantially less glare and reflectance than those heretofore known to be capable of transmitting to growing plants light capable of sustaining life.

A further related and important object of this invention is the provision of novel, improved methods of growing turf in enclosed structures under light transmitting barriers capable of materially reducing the temperature beneath the barrier in comparison to the temperature which would be obtained if a glass or other transparent barrier were employed.

Yet another important object of the present invention resides in the provision of novel, improved methods of growing turf under light transmitting barriers capable of beneficially affecting plant growth and development.

A still further object of this invention resides in the provision of novel, improved methods of growing turf in enclosed structures under conditions fitting the structure for human occupancy and activities.

Figure 2:
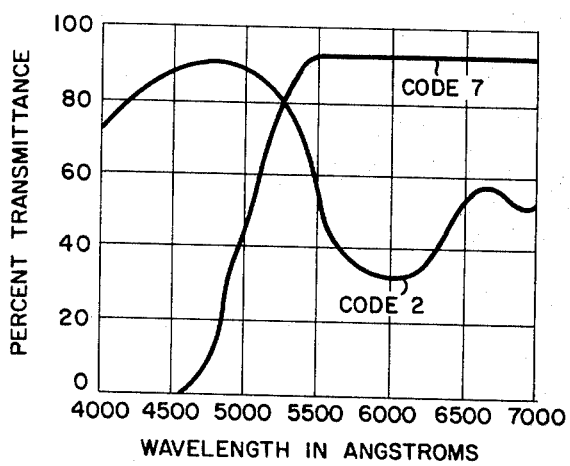
Figure 3:
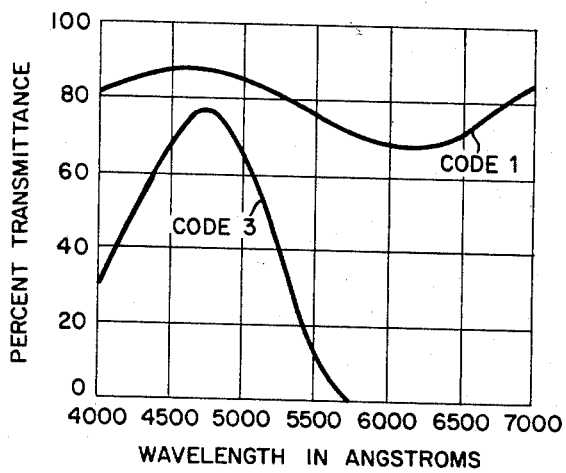
Figure 4:
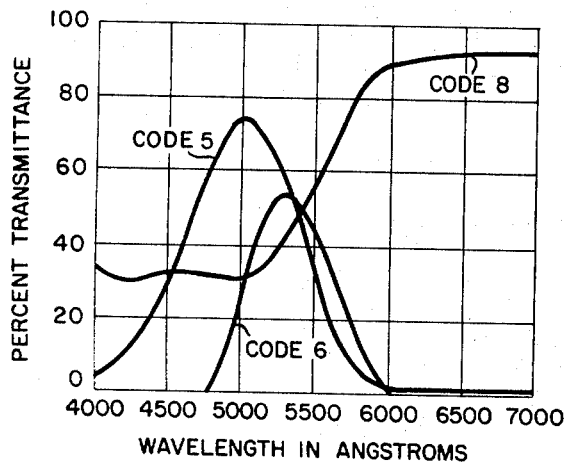
Figure 5:
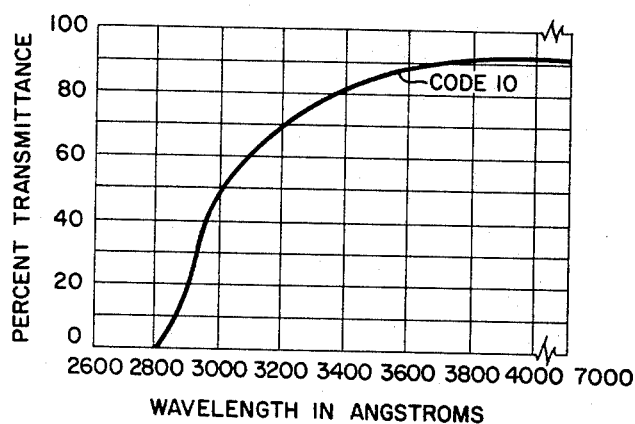

Other objects, additional novel features, and further important advantages of the present invention will become apparent from the appended claims and as the ensuing detailed description and discussion of exemplary applications of the principles of the invention proceeds in conjunction with the accompanying drawing in which FIGURES 1–5 show the light transmitting characteristics of certain materials tested for suitability as barrier materials in growing turf in accord with the present invention.

The examples which follow illustrate the application of the principles of the present invention to the growing of turfs of various types. The light transmitting barriers under which the turfs were grown were tinted or pigmented 0.125 inch thick Plexiglas® except for barrier 10, which was Rohm & Haas 0.125 inch thick II UVT clear Plexiglas®. Colors of the barriers, which are identified by code numbers in the accompanying drawing and in the examples, are as follows:

| Code No.: | Color |
|---|---|
| 1 | Blue Tint |
| 2 | Blue Tint |
| 3 | Blue |
| 4 | Green Tint |
| 5 | Green |
| 6 | Green |
| 7 | Yellow |
| 8 | Amber |
| 9 | Red Tent |
| 10 | No Pigment |

The following examples illustrate the application of the principles of this invention to various types of turf, the biological responses of the various grasses, and the properties of typical barrier materials.

*Example 1*

Established turf of *Poa pratensis* Windsor was fertilized with the equivalent of 5.4 pounds of nitrogen per year per 1000 square feet utilizing granular fertilizer having a 23–7–7 $N-P_2O_5-K_2O$ ratio. The turf was watered as needed to prevent wilting and cut weekly to assure optimum turf quality. Transparent barriers were mounted over the turf in mid-June and removed in the Fall.

The values tabulated below are average values recorded during the growing season.

TABLE 1.—THE INFLUENCE OF CERTAIN VISIBLE SPECTRUM RANGES ON COLOR AND INJURY OF WINDSOR KENTUCKY BLUEGRASS TURF

| Spectral Range [1] (Angstroms) | Transmittance [2] (Percent) | Code | Turf Color (Values are Given in Percent of Control, Full Sun) | Turf Injury (Percent) |
|---|---|---|---|---|
| Full Sun | 100.0 | | 100 | 0 |
| 4,375–5,100 | 23.2 | 3 | 121 | 10 |
| 5,200–5,450 [3] | 25.6 | 6 | 81 | 80 |
| 5,200–7,000 | 80.4 | 7 | 88 | 5 |
| 5,600–7,000 | 64.9 | 8 | 93 | 0 |

[1] Percent transmittance exceeding 70 percent between the range indicated. (Spectrophotometric curves obtained by utilizing a General Electric Recording Spectrophotometer—see FIGURES 1–5.)
[2] Total luminous transmittance from a simulated north sky daylight.
[3] Percent transmittance exceeding 50 percent between range indicated. (Spectrophotometer curves utilizing a General Electric Recording Spectrophotometer—see FIGURE 4.)

As shown by the data in the above table light in the spectral range of 4375–5100 angstroms is superior to light of all other wave lengths exceeding this range for growing turf when turf color is used as a criterion. It was unexpected to find that turf performance improved under this panel (Code 3) since the light intensity was only 23.2 percent of the full sun intensity. In contrast under a barrier transmitting light of a longer wave length range (5200–5450 angstroms) (Code 6) at a comparable percent light transmittance the turf exhibited very poor quality (80 percent injury).

*Example 2*

Four inch diameter sod plugs of two semitropical climate grasses and two temperate climate grasses were planted in separate six inch diameter plastic pots and placed under various barriers in full sun to obtain the spectral range desired in mid-June.

A granular fertilizer having a 23–7–7 $N-P_2O_5-K_2O$ ratio was applied at two different times during the summer to provide an adequate fertility level. Soil moisture was maintained at an adequate level at all times and the grasses were mowed as needed at the recommended mowing height. The percent injury tabulated below was recorded in mid-September of the same year; i.e., approximately three months after the plugs were placed under the barriers.

TABLE 2

| Spectral [1] Range (Angstroms) | Transmittance [2] (Percent) | Code | Percent Injury | | | | |
|---|---|---|---|---|---|---|---|
| | | | Ryegrass | Windsor Bluegrass | Bahia | St. Augustine | Average |
| Full Sun | 100.0 | | 0 | 0 | 0 | 0 | 0 |
| 4,200–6,000 | 77.0 | 4 | 10 | 2 | 2 | 0 | 3.5 |
| 4,000–4,400 and 5,600–7,000 | 61.6 | 9 | 35 | 10 | 3 | 5 | 13.3 |

[1] Percent transmittance exceeding 70 percent between the range indicated. (Spectrophotometric curves obtained by utilizing a General Electric Recording Spectrophotometer—See FIGURES 1–5.)
[2] Total luminous transmittance from a simulated north sky daylight.

As shown by the data in the above table, light spectral ranges removing the major portion of the light spectrum with wave lengths exceeding 6000 angstroms (Code 4) resulted in less injury to a wide range of turf grasses than light having wave lengths exceeding 6000 angstroms (Code 9). This again illustrated that a light band in the shorter wave length is more desirable for turf growth and development than those of the longer wave length band.

Example 3

On the 8th day of June, established sod of Windsor Kentucky bluegrass, creeping red fescue, Tifgreen Bermuda, and St. Augustine was placed under barriers which transmitted light of the sun in specific spectral ranges only. The turf was maintained under a good watering and fertility program to assure maximum turf quality. All plots were mowed at weekly intervals at 1½ inch mowing height. The observations of this sod, which are tabulated below in Tables 3-7 were made on September 15 of the same year.

shorter wave lengths of light (4000-6000 angstroms) and reduced transmittance (23.2 to 77 percent transmittance) in improving turf color and quality.

TABLE 5.—SPIKE DEVELOPMENT OF TIFGREEN BERMUDA AS AFFECTED BY VARIOUS SPECTRAL RANGES OF LIGHT

| Spectral [1] Range (Angstroms) | Transmittance [2] (Percent) | Code | Spike Coverage (Percent) |
|---|---|---|---|
| Full Sun | 100 | --- | 90 |
| 4,000–5,750 and 6,400–7,000 | 75.6 | 1 | 90 |
| 4,000–5,350 | 55.3 | 2 | 5 |
| 4,375–5,100 | 23.2 | 3 | 0 |
| 4,200–6,000 | 77.0 | 4 | 90 |
| 4,150–6,000 | 29.5 | 5 | 0 |
| 3,200–7,000 [3] | 92.0 | 10 | 90 |

[1] Percent transmittance exceeding 70 percent between the range indicated. (Spectrophotometric curves obtained by utilizing a General Electric Recording Spectrophotometer—See Figures 1-5.)
[2] Total luminous transmittance from a simulated north sky daylight.
[3] Clear barrier, no pigmentation.

TABLE 3.—THE INFLUENCE OF A BARRIER OF THE PREFERRED VISIBLE SPECTRUM RANGE ON COLOR OF CERTAIN TURF GRASSES

| Spectral [1] Range (Angstroms) | Transmittance [2] (Percent) | Code | Turf Color (Values are given in percent of control, full sun) | | | |
|---|---|---|---|---|---|---|
| | | | Bluegrass | Fescue | Bermuda | St. Augustine |
| Full Sun | 100 | --- | 100 | 100 | 100 | 100 |
| 4,000–5,750 and 6,400–7,000 | 75.6 | 1 | 116 | 115 | [3] 112 | [3] 138 |
| 4,000–5,350 | 55.3 | 2 | 107 | 118 | [3] 118 | [3] 150 |
| 4,375–5,100 | 23.3 | 3 | 100 | 100 | 100 | [3] 135 |
| 4,200–6,000 | 77.0 | 4 | 100 | [3] 128 | 100 | 86 |
| 4,150–6,000 | 29.5 | 5 | 60 | 79 | 52 | 116 |
| 3,200–7,000 [4] | 92.0 | 10 | 116 | 118 | 106 | 116 |

[1] Percent transmittance exceeding 70 percent between the range indicated. (Spectrophotometric curves obtained by utilizing a General Electric Recording Spectrophotometer—See FIGURES 1-5.)
[2] Total luminous transmittance from a simulated north sky daylight.
[3] Significantly different from the control (full sun) at the 5 percent level of probability.
[4] Clear barrier, no pigmentation.

TABLE 4.—THE INFLUENCE OF A BARRIER OF THE PREFERRED VISIBLE SPECTRUM RANGE ON THE INJURY OF CERTAIN TURF GRASSES

| Spectral [1] Range (Angstroms) | Transmittance [2] (Percent) | Code | Turf Injury (Percent) | | | |
|---|---|---|---|---|---|---|
| | | | Bluegrass | Fescue | Bermuda | St. Augustine |
| Full Sun | 100 | --- | 1.0 | 7.5 | 10.0 | 2.0 |
| 4,000–5,750 and 6,400–7,000 | 75.6 | 1 | 1.0 | 15.0 | 15.0 | 1.0 |
| 4,000–5,350 | 55.3 | 2 | 1.0 | 3.0 | 5.0 | 1.0 |
| 4,375–5,100 | 23.2 | 3 | [3] 6.0 | [2] 60.0 | 35.0 | 1.0 |
| 4,200–6,000 | 77.0 | 4 | 1.0 | 12.5 | 17.5 | 3.0 |
| 4,150–6,000 | 29.5 | 5 | [3] 80.0 | [3] 75.0 | [3] 50.0 | 2.0 |
| 3,200–7,000 [4] | 92.0 | 10 | 1.0 | 15.0 | 12.5 | 1.0 |

[1] Percent transmittance exceeding 70 percent between the range indicated. (Spectrophotometric curves obtained by utilizing a General Electric Recording Spectrophotometer—See Figures 1-5.)
[2] Total luminous transmittance from a simulated north sky daylight.
[3] Significantly different from the control (full sun) at the 5 percent level of probability.
[4] Clear barrier, no pigmentation.

Turf color was improved by all of the spectral ranges selected. However, species response varied depending on the spectral range selected. Turf quality was excellent in all cases where there was a significant improvement in turf color. This data again illustrates the superiority of the As shown by the data in the above table, spike development, which distracts from the quality of Bermuda turf, can unexpectedly be reduced dramatically by restricting the light reaching the turf to certain spectral ranges as described above. This improves turf quality dramatically as compared to Bermuda turf grown under full sunlight, which develops spikes profusely in the late spring.

TABLE 6.—TURF DENSITY OF CERTAIN TURF GRASSES AS AFFECTED BY VARIOUS SPECTRAL RANGES

| Spectral[1] Range (Angstroms) | Transmittance[2] (Percent) | Code | Plant Count Per Square Inch of Turf Area | |
|---|---|---|---|---|
| | | | Bluegrass | St. Augustine |
| Full Sun | 100 | | 11.3 | 6.9 |
| 4,000–5,750 and 6,400–7,000 | 75.6 | 1 | 11.4 | 6.7 |
| 4,000–5,350 | 55.3 | 2 | 10.4 | 7.9 |
| 4,375–5,100 | 23.2 | 3 | [3] 5.4 | 6.3 |
| 4,200–6,000 | 77.0 | 4 | 10.0 | 7.4 |
| 4,150–6,000 | 29.5 | 5 | 6.5 | 6.0 |
| 3,200–7,000[4] | 92.0 | 10 | 10.9 | 7.3 |

[1] Percent transmittance exceeding 70 percent between the range indicated. (Spectrophotometric curves obtained by utilizing a General Electric Recording Spectrophotometer—see Figures 1–5.)
[2] Total luminous transmittance from a simulated north sky daylight.
[3] Significantly different from the control (full sun) at the 5 percent level of probability.
[4] Clear barrier, no pigmentation.

Turf density of the St. Augustine turf was comparable to that of turf grown in full sunlight irrespective of the spectral range of the light transmitted to the turf. For transmittances of not less than 55 percent, the density of the bluegrass turf was also excellent.

The foregoing data again illustrates that excellent turf density can be obtained at reduced light intensity and under modified selected spectral ranges of light.

TABLE 7.—GENERAL TURF QUALITY OF CERTAIN TURF GRASSES AS AFFECTED BY VARIOUS SPECTRAL RANGES OF LIGHT

| Spectral[1] Range (Angstroms) | Transmittance[2] (Percent) | Code | Turf Quality (Values are given in percent of Control (Full Sun)) | | | |
|---|---|---|---|---|---|---|
| | | | Bluegrass | Fescue | Bermuda | St. Augustine |
| Full Sun | 100 | | 100 | 100 | 100 | 100 |
| 4,000–5,750 and 6,400–7,000 | 76.6 | 1 | 100 | 100 | 112 | [3] 117 |
| 4,000–5,350 | 55.3 | 2 | 95 | 106 | [3] 120 | [3] 117 |
| 4,375–5,100 | 23.2 | 3 | [3] 85 | 94 | 100 | [3] 117 |
| 4,200–6,000 | 77.0 | 4 | 100 | 88 | 106 | 100 |
| 4,150–6,000 | 29.5 | 5 | [3] 55 | [3] 70 | [3] 70 | 106 |
| 3,200–7,000[4] | 92.0 | 10 | 100 | 100 | 106 | [3] 117 |

[1] Percent transmittance exceeding 70 percent between the range indicated. (Spectrophotometric curves obtained by utilizing a General Electric Recording Spectrophotometer—See Figures 1–5.)
[2] Total luminous transmittance from a simulated north sky daylight.
[3] Significantly different from the control (full sun) at the 5 percent level of probability.
[4] Clear barrier, no pigmentation.

General turf quality was improved by all spectral ranges evaluated. However, response varied with species. The turf quality of Bermuda and St. Augustine was excellent and significantly improved as compared to turf grown in full spectrum sunlight when the preferred spectral ranges were utilized. The turf quality of bluegrass and fescue grown under barriers transmitting 55 percent or higher was comparable to that of turf grown in full sunlight.

As discussed above, one of the novel and important features of growing turfs in accord with the principles of this invention is that, as shown by the following table, the preferred barrier materials have a relatively low glare rating and low reflectance.

TABLE 8.—GLARE RATING AND REFLECTANCE (IN SUBDUED LIGHT, 2.6 FOOT CANDLES) OF VARIOUS BARRIERS VARYING IN THE SPECTRAL RANGES OF LIGHT THEY WILL TRANSMIT

| Spectral[1] Range (Angstroms) | Color Code | Code | Glare Rating[3] | Reflectance[2] (Values are given in percent of control, clear) |
|---|---|---|---|---|
| Full light Source[4] | No Barrier | | 1 | |
| 4,000–5,750 and 6,400–7,000 | Blue Tint | 1 | 2 | 72.2 |
| 4,000–5,350 | Do | 2 | 3 | 63.9 |
| 4,375–5,100 | Blue | 3 | 5 | 61.1 |
| 4,200–6,000 | Green Tint | 4 | 3 | 80.6 |
| 4,150–6,000 | Green | 5 | 4 | 58.3 |
| 5,200–5,450[5] | Do | 6 | 6 | 50.0 |
| 5,200–7,000 | Yellow | 7 | 2 | 86.1 |
| 5,600–7,000 | Amber | 8 | 2 | 77.7 |
| 4,000–4,400 and 5,600–7,000 | Red Tint | 9 | 4 | 91.6 |
| 3,200–7,000 | Clear | 10 | 1 | 100 |

[1] Percent transmittance exceeding 70 percent between the range indicated. (Spectrophotometric curves obtained by utilizing the General Electric Recording Spectrophotometer.)
[2] Based on reflectance obtained 2¾ inches from a barrier placed 6 inches from the light source.
[3] One (1) greatest glare, 10 no transmittance. The numbers are based on visual ratings of light transmitted through the barrier.
[4] Light intensity was 90 foot candles 3.5 feet from the light source which was a 750 watt 120 v. DPJ GE bulb.
[5] Percent transmittance exceeding 50 percent between the range indicated.

As shown in the above table the glare and reflectance of all pigmented barriers were lower than that of non-pigmented barriers with those transmitting light in the preferred spectral ranges having the best glare ratings and lowest reflectivities. This factor is important since glare and reflectance increase the frequency of errors in athletic events and are causes of much irritation to people under the barrier.

Another important advantage of growing turfs in accord with the principles of this invention is the marked reduction in the temperature below the barrier under which the turf is grown. Data pertaining to this aspect of the invention is assembled in Table 9.

TABLE 9.—TEMPERATURE IN FULL SUNLIGHT UNDER VARIOUS BARRIERS VARYING IN THE SPECTRAL RANGES[1] OF LIGHT THEY TRANSMIT

| Spectral[2] Range (Angstroms) | Color Code | Code | Temperature[1] (° F.) |
|---|---|---|---|
| Full Sun | | | 102 |
| 4,000–5,350 | Blue Tint | 2 | 94 |
| 4,375–5,100 | Blue | 3 | 92 |
| 4,200–6,000 | Green Tint | 4 | 98 |

[1] Temperature measurement made at the turf surface one foot below the barrier in early July at 1:00 P.M.
[2] Percent transmittance exceeding 70 percent between the range indicated. (Spectrophotometric curves obtained by utilizing the General Electric Recording Spectrophotometer.)

As shown above, the temperature is markedly reduced by various barriers. This temperature reduction is highly advantageous since refrigeration requirements are greatly reduced when such barriers are utilized to enclose an area. The tabulated data also shows that the barriers producing the greatest impediment to heat flow are the same ones capable of transmitting the spectral ranges of light which produce the highest quality turfs.

The following table is included to further illustrate the properties of barriers tested with the results reported in the table set forth above.

TABLE 10.—SPECTROGRAPHIC DATA AND MAXIMUM TRANSMITTANCE RANGE OF BARRIERS TESTED

| Spectral [1] Range (Angstrom) | Figure No. | Simulated North Sky Daylight | | | Code |
|---|---|---|---|---|---|
| | | Total Luminous Transmittance (Percent) | Trichromatic Coefficients | | |
| | | | (X) | (Y) | |
| 4,000–5,750 and 6,400–7,000 | 3 | 75.6 | 0.290 | 0.301 | 1 |
| 4,000–5,350 | 2 | 55.3 | 0.236 | 0.267 | 2 |
| 4,375–5,100 | 3 | 23.2 | 0.136 | 0.182 | 3 |
| 4,200–6,000 | 1 | 77.0 | 0.297 | 0.324 | 4 |
| 4,150–6,000 | 4 | 29.5 | 0.147 | 0.328 | 5 |
| 5,200–5,450 [2] | 4 | 25.6 | 0.239 | 0.694 | 6 |
| 5,200–7,000 | 2 | 80.4 | 0.452 | 0.504 | 7 |
| 5,600–7,000 | 4 | 64.9 | 0.414 | 0.375 | 8 |
| 4,000–4,400 and 5,650–7,000 | 1 | 61.6 | 0.363 | 0.300 | 9 |
| 3,200–7,000 | 5 | 90 | | | 10 |

[1] Percent transmittance exceeding 70 percent between the range indicated. (Spectrophotometric curves obtained by utilizing a General Electric Recording Spectrophotometer.)
[2] Percent transmittance exceeding 50 percent between the range indicated.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of producing a turf in a controlled environment, comprising the step of growing said turf under conditions in which the wave length and intensity of the light reaching the turf are regulated by isolating said turf from light incident thereon with a barrier of a material having a transmittance of from about 55 to about 77–80 percent and maximum transmittance for energy having wave lengths in the range of from about 4000 to about 6000 angstroms.

2. The method of growing St. Augustine grasses and grasses having light responsive growth characteristics similar to those of St. Augustine grasses in a controlled environment, comprising the step of growing the grass under conditions in which the wave length and intensity of the light reaching the grass are regulated by isolating the grass from light incident thereon with a barrier of a material having a transmittance of from about 23 to about 77–80 percent and maximum transmittance for energy having wave lengths in the range of from about 4000 to about 6000 angstroms.

3. The method of growing fescues and grasses having light responsive growth characteristics similar to those of fescues in a controlled environment, comprising the step of growing the grass under conditions in which the wave length and intensity of the light reaching the grass are regulated by isolating the grass from light incident thereon with a barrier of a material having a transmittance of from about 55 to about 77–80 percent and maximum transmittance for energy having wave lengths in the range of from about 4000 to about 6000 angstroms.

4. The method of growing semitropical grasses and grasses having light responsive growth characteristics similar to those of semitropical grasses in a controlled environment, comprising the step of growing the grass under conditions in which the wave length and intensity of the light reaching the grass are regulated by isolating said grass from light incident thereon with a barrier of a material selected from the group of those having a transmittance of at least about 23 percent and maximum transmittance for energy having wave lengths in the range of from about 4375 to about 5100 angstroms and those having a transmittance of from about 55 to about 77–80 percent and a maximum transmittance for energy having wave lengths in the range of from about 4000–6000 angstroms.

5. The method of growing bluegrasses and grasses having light responsive growth characteristics similar to those of bluegrasses in a controlled environment, comprising the step of growing the grass under conditions in which the wave length and intensity of the light reaching the grass are regulated by isolating the grass from light incident thereon with a barrier of a material having a transmittance of from about 55 to about 77–80 percent and maximum transmittance for energy having wave lengths in the range of from about 4000 to about 6000 angstroms.

6. The method of growing Bermuda grasses and grasses having light responsive growth characteristics similar to those of Bermuda grasses in a controlled environment, comprising the step of growing the grass under conditions in which the wave length and intensity of the light reaching the grass are regulated by isolating the grass from light incident thereon with a barrier of a material having a transmittance of from about 55 to about 77–80 percent and maximum transmittance for energy having wave lengths in the range of from about 4000 to about 5750 angstroms.

References Cited

UNITED STATES PATENTS 3,089,280   5/1963   Klaas _____ 47—58
3,352,058   11/1967  Brant _____ 47—58

ROBERT E. BAGWILL, *Primary Examiner.*

UNITED STATES PATENT OFFICE
CERTIFICATE OF CORRECTION

Patent No. 3,395,487                      August 6, 1968

John A. Long et al.

It is certified that error appears in the above identified patent and that said Letters Patent are hereby corrected as shown below:

Column 4, line 3, "Tent" should read -- Tint --. Columns 3 and 4, TABLE 2, first column, line 5 thereof, "5,600-7,000" should read -- 5,650-7,000 --. Column 8, TABLE 8, first column, line 11 thereof, "5,600-7,000" should read -- 5,650-7,000 --.

Signed and sealed this 13th day of January 1970.

(SEAL)
Attest:

Edward M. Fletcher, Jr.
Attesting Officer

WILLIAM E. SCHUYLER, JR.
Commissioner of Patents